United States Patent
Bull

(10) Patent No.: US 6,315,898 B1
(45) Date of Patent: Nov. 13, 2001

(54) EMULSION TREATING METHOD AND APPARATUS

(76) Inventor: Hendrix R. Bull, P.O. Box 301203, Escondido, CA (US) 92030

( * ) Notice: Subject to any disclaimer, the term of this patent is extended or adjusted under 35 U.S.C. 154(b) by 0 days.

(21) Appl. No.: 09/561,203

(22) Filed: Apr. 27, 2000

(51) Int. Cl.[7] ....................................................... C02F 1/40
(52) U.S. Cl. ............................ 210/187; 210/243; 210/521; 210/540; 210/DIG. 5
(58) Field of Search ........................................ 210/521, 522, 210/532.1, 538, 540, DIG. 5, 187, 243

(56) References Cited

U.S. PATENT DOCUMENTS

| | | | |
|---|---|---|---|
| 2,573,615 | * 10/1951 | Senilles | 210/521 |
| 3,389,536 | 6/1968 | Bull . | |
| 4,257,895 | * 3/1981 | Murdock | 210/DIG. 5 |
| 4,329,159 | 5/1982 | Bull . | |
| 4,385,986 | * 5/1983 | Jaisinghani et al. | 210/521 |
| 4,469,582 | * 9/1984 | Sublette et al. | 210/521 |
| 4,514,303 | * 4/1985 | Moore | 210/521 |
| 4,722,800 | * 2/1988 | Aymong | 210/DIG. 5 |
| 4,919,777 | 4/1990 | Bull . | |
| 4,957,628 | * 9/1990 | Schulz | 210/521 |
| 5,538,631 | * 7/1996 | Yeh | 210/521 |
| 5,865,992 | * 2/1999 | Edmondson | 210/540 |
| 6,079,571 | * 6/2000 | Stowell | 210/DIG. 5 |

* cited by examiner

Primary Examiner—Christopher Upton
(74) Attorney, Agent, or Firm—Sheldon & Mak; Denton L. Anderson

(57) ABSTRACT

A treater for electrostatically and/or mechanically separating emulsified brine from oil during longitudinal flow through a horizontally elongate metal tank. Emulsion is directed through a louver stack made up of a large number of inclined parallel plates. The openings on the upstream end and on the downstream end of this louver stack are adjustable from outside of the metal tank, so as to allow the operator to adjust the flow rate through the treater as operating parameters change.

19 Claims, 4 Drawing Sheets

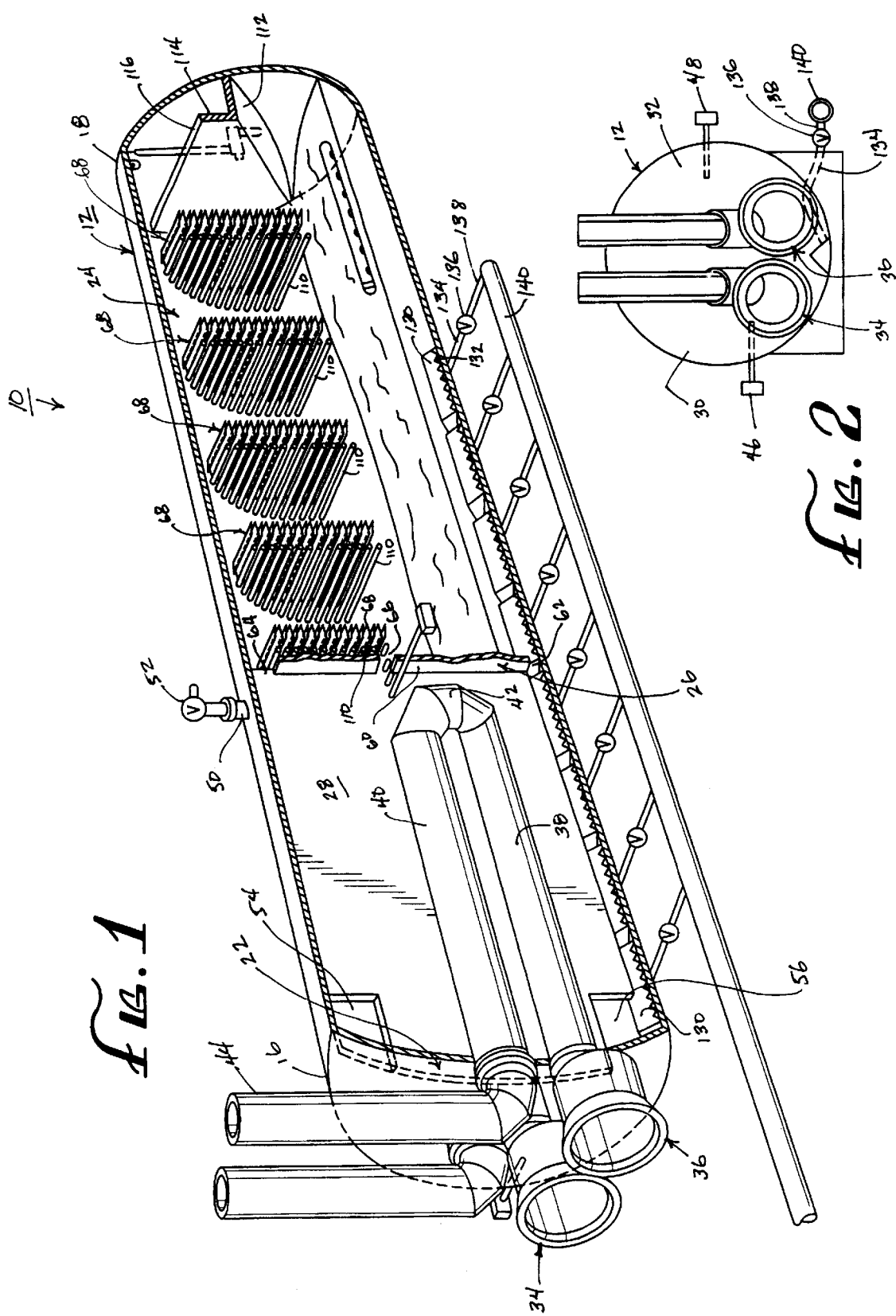

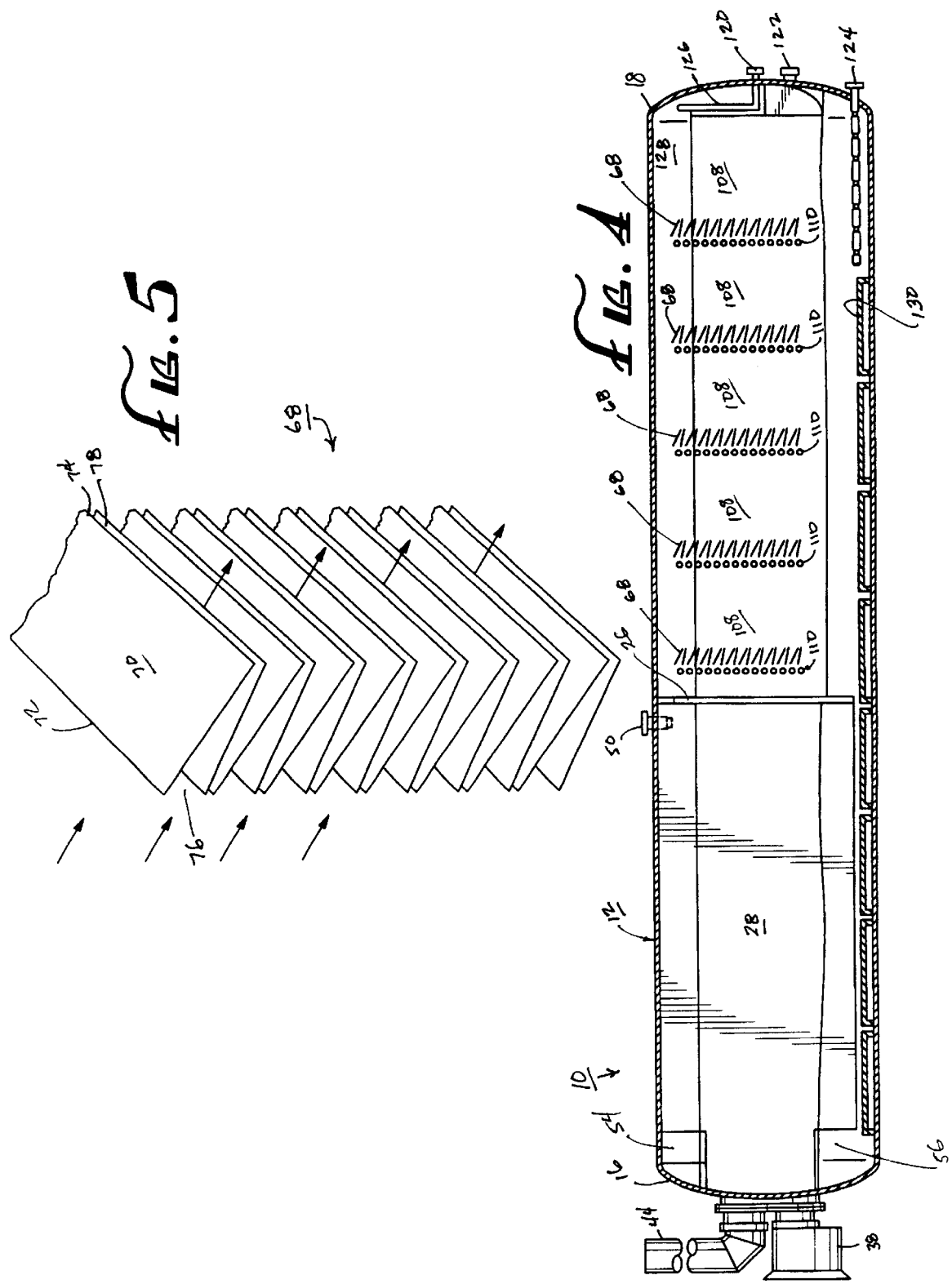

EMULSION TREATING METHOD AND APPARATUS

FIELD OF THE INVENTION

This invention relates generally to oil/water emulsion treating methods and apparatuses, and, more particularly, to oil/water emulsion treating methods and apparatuses employing an elongate horizontal separation vessel.

BACKGROUND OF THE INVENTION

Petroleum as it is naturally produced from an underground formation, is in most cases a mechanical mixture of oil, entrained gas and salt water, some of which latter may be present as an oil/brine emulsion. It is desirable, and usually necessary to treat the petroleum thus produced at the wellhead, for the separation and removal of the entrained gas and emulsified brine, in order to render the oil pipelineable. Usually, the separated salt water is pumped back into the formation, in order to assist in maintaining the pressure therein, and also to resolve the salt water disposal problem. Separated gas is vented or flared, if in small quantities, and if in commercial volumes, is delivered to a pipeline for distribution. The equipment used for this three-phase separation is known as a treater, and is generally quite familiar to those to whom the present invention will be addressed.

Such treaters normally involve the heating of the produced petroleum, in order to lower the viscosity of the fluid phase, and also to assist in the separation of the entrained gas. Brine droplets are coalesced either mechanically, as by forcing the emulsion through a series of perforated baffles; or electrostatically as by forcing the emulsion through a high-energy, electrically charged field; or chemically, by means of surface-active chemical agents which reduce the surface tension on the water droplets, thereby allowing them to coalesce into larger drops for separation by gravity. Frequently, two or more coalescing methods are employed in a treater.

Treaters have evolved in design from early developed open vats which maintained the produced petroleum in stationary condition for several days, permitting the entrained gas to freely separate to atmosphere and the salt water to separate to the bottom of the vat by gravity. There evolved heating methods in order to expedite the treatment by reducing the viscosity of the oil, as described. Subsequent development evolved the heater-treater which is the current state-of-the art comprising an elongated enclosed tank having a burner-fired heater section and a downstream treater section for a continuous flow, with a series of perforated baffles positioned within the treater section transversely to the flow of fluids; the perforated baffles function to promote the even distribution over the full cross-sectional area of the treater section of the fluids in motion, and to cause a pressure drop within the fluid across the perforated baffles which results in a release of entrained gases, which then collect in the upper volume of the tank for removal. However, salt water emulsions within the oil have continued to be inefficiently treated by gravity settling and baffling of the flow following heating: thus, further measures have been necessary in order to cause coalescing of the small droplets of brine into larger drops which could be settled out by gravity.

The conventional treatment has the operational disadvantages of being time-consuming, due to the residence-time required in the treater and the requirement that the petroleum be heated to a sufficiently high temperature to reduce the viscosity thereof so that coalescing of the emulsified droplets will be encouraged. The maintenance of a large quantity of oil at a relatively high temperature is costly of energy, and requires the equipment involved to be capable of sustained operation at the temperatures involved.

Treaters in current use are normally tanks in the form of elongated horizontal cylinders divided by means of internal partitions into compartments through which the petroleum will sequentially flow. Burner-fired heaters are normally included in the upstream heater section for heating the emulsion to the desired temperature, during which most of the entrained gas and some of the brine will separate from the emulsion. The partially demulsified brine then flows into a treater section, in substantially gas-free state, encountering a series of baffles adapted to encourage even flow of fluids and to avoid the formation of flow channels within the fluid body, thereby to assist in separation of remaining gases and coalescing of water droplets, and their separation by gravity to the bottom of the tank for ultimate discharge removal.

Various techniques of improvement have heretofore been employed in order to minimize treatment time and heat energy consumption. In my U.S. Pat. No. 4,329,159, "Energy Saving Heavy Crude Oil Emulsion Treating Method and Apparatus for Use Therewith" (which is incorporated herein in its entirety by this reference), there is described a method and apparatus of the type described, additionally including a number of metallic apertured grid electrodes suspended adjacent apertured baffles, the electrodes being supplied with electrical energy. A series of longitudinally spaced electrical fields of high potential are thereby created, which cause droplets of emulsified brine to move in violent random fashion, the droplets coalescing and collecting into drops of sufficient weight as to fall by gravity to the lower portion of the treater section for removal.

In my U.S. Pat. No. 4,919,777, "Electrostatic/Mechanical Emulsion Treating Method and Apparatus" (which is incorporated herein in its entirety by this reference), there is described an improved method and apparatus of this type, wherein, immediately downstream of the apertured grid electrodes, the flow is directed downwardly through a plurality of inclined open-ended tubes arranged in bundle-fashion.

Unfortunately, most such prior art methods and the apparatuses are inherently inflexible in operation. The apparatuses are designed for a narrow range of operating parameters, such as flow rate, oil/water ratio, salinity, temperature, viscosity, etc. After the apparatuses are manufactured and installed, they are only effective when operating within these narrow design operating ranges. When operating conditions change, an entirely new apparatus must be designed, built and installed. This is a special problem for crude oil producers, because crude oil/water emulsions produced in an oil field can vary dramatically from well to well, and even within the same well from day to day.

Accordingly, there is a need for further improvements in methodology and apparatuses which will overcome these problems in the prior art.

SUMMARY

The invention satisfies this need. The invention is an emulsion separating treater comprising: (a) a generally horizontally elongate enclosed tank having a longitudinal axis, a first end and an opposed second end, (b) an emulsion inlet port, (c) an oil outlet port and a water outlet port, (d) a louver stack located within the tank between the oil inlet port and the oil outlet port, the louver stack being disposed perpendicular to the longitudinal axis of the tank and comprising a plurality of at least four parallel plates each having an upstream edge and a downstream edge, adjoining upstream edges defining a plurality of generally horizontal inlet openings and adjoining downstream edges defining a plurality of generally horizontal outlet openings, and (e) an adjustment mechanism for adjusting the opening widths from outside of the tank.

DRAWINGS

These features, aspects and advantages of the present invention will become better understood with regard to the following description, appended claims and accompanying figures where:

FIG. 1 is a perspective view of the preferred embodiment apparatus of the invention, with a longitudinal portion thereof cut away to illustrate the interior of the apparatus;

FIG. 2 is an end view of the apparatus of FIG. 1 depicting the heater section;

FIG. 4 is a longitudinal cross-sectional view of the apparatus of FIG. 1;

FIG. 5 is an isometric detail view of a louver stack useful in the invention;

DETAILED DESCRIPTION

Figure 3:
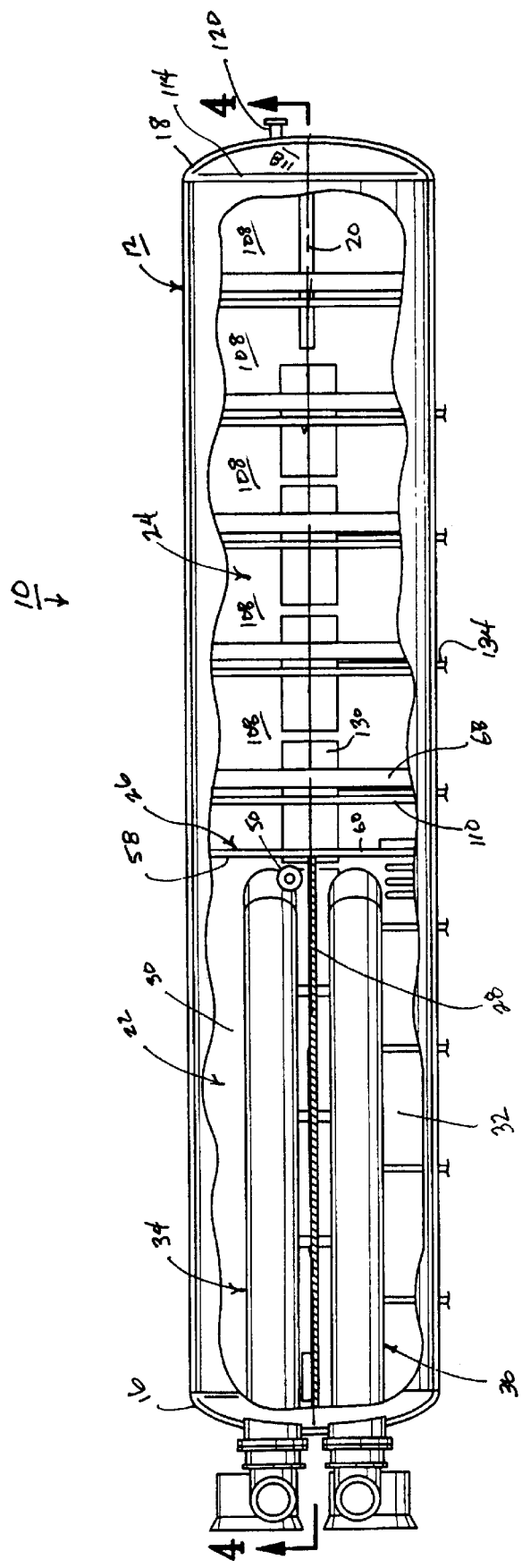
FIG. 3 is a top plan view of the apparatus of FIG. 1 with a portion cut away to illustrate the position of the several components and the location of certain outlets.

The following discussion describes in detail one embodiment of the invention and several variations of that embodiment. This discussion should not be construed, however, as limiting the invention to those particular embodiments. Practitioners skilled in the art will recognize numerous other embodiments as well.

The invention is an emulsion separating treater 10 useful for separating water droplets from an oil/water emulsion. The treater 10 comprises an elongate horizontal tank 12 having disposed therein one or more louver stacks described in greater detail below.

The tank 12 is a fully enclosed vessel, typically made from a steel. The tank is elongate and generally disposed in the horizontal. The tank has a first end 16, an opposed second end 18 and a longitudinal axis 20.

In the embodiment illustrated in the drawings, a two-stage heater section 22 is disposed proximate to the first end 16 of the tank 12 and a treater section 24 is disposed proximate to the second end 18 of the tank 12. A transverse bulkhead 26 separates the tank 12 into these two functional sections 22 and 24. A longitudinal bulkhead 28 extends from the first end 16 of the tank 12 to the transverse bulkhead 26 thereby defining a first longitudinally extending heater compartment 30 and a second longitudinally-extending heater compartment 32, situated side-by-side and connected in series. The longitudinal bulkhead 28 has an upper opening 54 and a lower opening 56, both located adjacent the first end 16 of the tank 12.

Within the two heater compartments 30 and 32 are substantially identical first and second heaters 34 and 36, respectively. Each heater 34 and 36 has a tubular lower leg 38, a tubular upper leg 40 and a U-shaped end connector 42. The lower leg 38 of each heater 34 and 36 extends through the first end 16 of the tank 12. The upper leg 30 of each heater 34 and 36 is connected in fluid tight communication to a stack 44 which extends upwardly outside of the tank 12. The temperature of the emulsion is monitored and controlled in the first heater section 34 by a first temperature sensor/controller 46 and in the second heater compartment 32 by a second temperature sensor/controller 48.

The tank 12 comprises an emulsion inlet port 50 through which emulsion can be delivered continuously into the heater section 22. The emulsion inlet port 50 desirably has a normally-open manually operated inlet valve 52 associated therewith.

In the embodiment illustrated in the drawings, the transverse bulkhead 26 is divided by the longitudinal bulkhead 28 into a left half 58 and a right half 60. The left half 58 is solid, while the right half 60 has a lower opening 62, an upper opening 64 and an intermediate opening 66 defined therein.

Disposed within the treater section 24 is at least one louver stack 68 disposed perpendicular to the longitudinal axis 20 of the tank 12. The louver stack 68 comprises a plurality of at least four parallel plates 70. Each parallel plate 70 has an upstream edge 72 and a downstream edge 74. The distance between the upstream edge 72 and the downstream edge 74 of each plate 70 (i.e., the width of each plate 70) is between about 6 inches and about 36 inches, typically between about 16 inches and about 20 inches. Adjoining upstream edges 72 of the parallel plates 70 define a plurality of generally horizontal inlet louver openings 76 through which an oil/water emulsion flowing through the tank 12 must pass. Similarly, adjoining downstream edges 74 of the parallel plates 70 define a plurality of generally horizontal outlet louver openings 78 from which emulsion passing through the louver stack 68 must exit the louver stack 68. Each of the plates 70 is inclined downwardly so that each inlet louver opening 76 is at an elevation slightly higher than its corresponding outlet louver opening 78. By this design, emulsion flowing into each inlet louver opening 76 is diverted downwardly as it passes through the louver stack 68.

Typically, the louver plates 70 are made from a metal, such as a steel. The louver openings 76 and 78 are typically 0.25 inches to 1.75 inches when maximized. The number of plates 70 in each louver stack 68 will depend upon the diameter of the tank 12. For a 6 foot diameter tank, the typical number of plates 70 in each louver stack 68 is 70–80. In a 12 foot diameter tank 12, the typical number of plates 70 in each louver stack 68 is 125–150.

Figure 6:
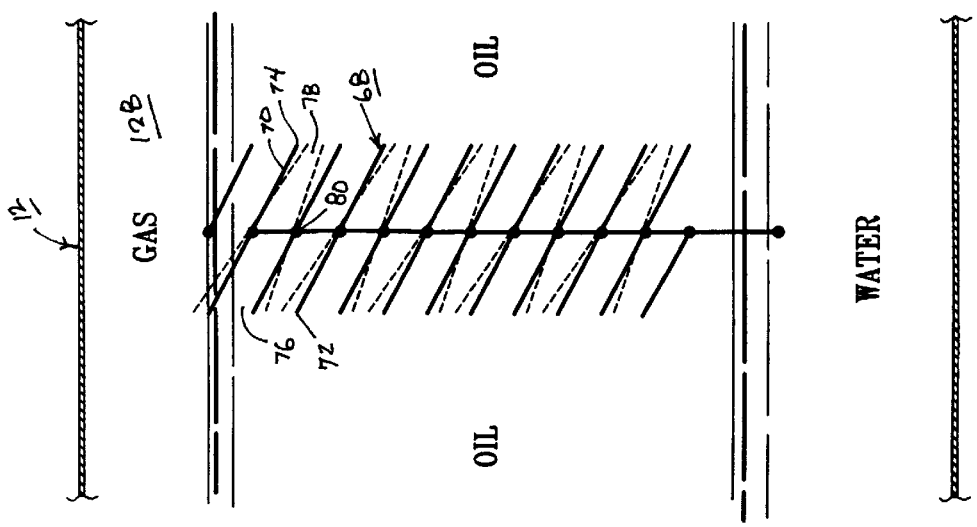
FIG. 6 is a diagrammatic side view of a louver stack useful in the invention.

Some or all of the parallel plates 70 within the louver stack 68 are movable with respect to adjacent plates 70 so that the width of at least some of the louver openings 76 and 78 are adjustable from outside the tank 12. This can be accomplished in many different ways. In the embodiments illustrated in FIGS. 6–7, this is accomplished by making each of the plates 70 pivotable about horizontal axes 80 disposed between the upstream edge 72 and the downstream edge 74 of each plate 70. As best seen in FIG. 6, to narrow the flow path through the louver stack 68, every other plate 70 is pivoted clockwise, while the remaining plates 70 are pivoted counterclockwise. By this action, half of the inlet louver openings 76 and half of the outlet louver opening 78 are narrowed.

Figure 7:
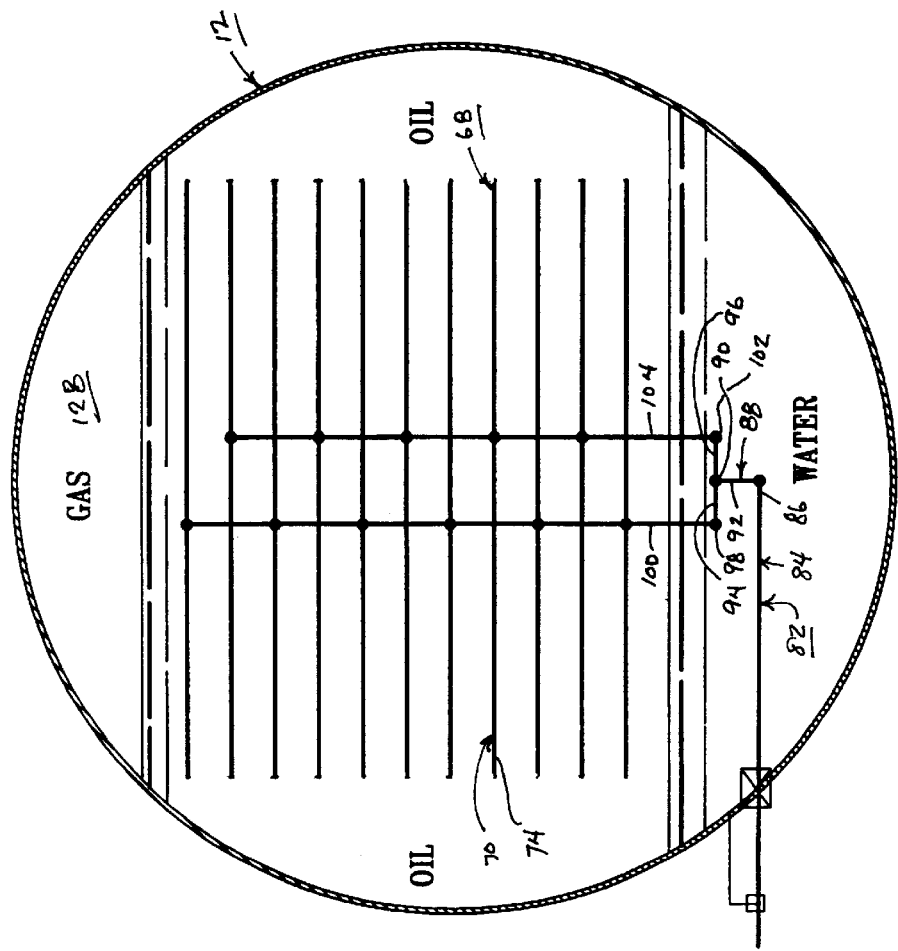
FIG. 7 is a diagrammatic front view of a louver stack useful in the invention.

FIG. 7 illustrates a push/pull rod mechanism 82 for adjusting the louver opening widths from outside the tank 12. In FIG. 7, a push/pull rod 84 is movable in a left/right direction. The distal end 86 of the push/pull rod 84 is attached to a rocker arm 88 which pivots about a pivot axis 90. The rocker arm 88 has a control arm 92 and a pair of oppositely disposed operation arms. In the drawings, these operation arms are designated as first operation arm 94 and second operation arm 96. At the distal end 98 of the first operation arm 94, a first connecting rod 100 extends upwardly and attaches to the downstream edges 74 of alternating plates 70 in the louver stack 68. At the distal end 102 of the second operation arm 96, a second connecting rod 104 extends upwardly and attaches to the downstream edges 74 of the remaining plates 70 in the louver stack 68. Thus, when the push/pull rod 84 is slid to the right in FIG. 7, the rocker arm 88 is rotated in a counterclockwise direction, thereby pushing the second connecting rod 104 upward and pulling the first connecting rod 100 downward. By this operation, the first and second connecting rods 100 and 104 draw alternating adjacent pairs of the upstream edges 72 and the downstream edges 74 of the plates 70 closer together, thereby causing the widths of one half of the louver openings 76 and 78 to narrow. To re-widen the widths of the louver openings 76 and 78, the push/pull rod 84 is slid back to the left, towards the original orientation illustrated in FIG. 7. Alternatively, a similar push/pull rod mechanism 82 can be attached to the upstream edge 72 of each plate 70. In such a design, the operation of the push/pull rod mechanism 82 would be the same as described above, except it would operate in reverse.

In a typical embodiment of the invention 10, the louver openings 76 and 78 are adjustable by at least 0.5 inches. Preferably, the louver openings 76 and 78 are continually adjustable from a full open position to a fully closed position.

Typically, the apparatus 10 will comprise a plurality of spaced apart louver stacks 68 which define a plurality of discrete demulsifying units 108 disposed in series within the treater section 24. The embodiment illustrated in FIGS. 1–4 has five demulsifying units 108. The treater 10 may contain any desired number of demulsifying units 108 and such specific configurations will normally be determined by the characteristics of the emulsion to be treated.

Preferably, an electrostatic field inducer 110, such as an electrostatic grid, is transversely disposed in vertical alignment immediately upstream of each louver stack 68. The electrostatic field inducers 110 are supported from the tank 12 by conventional electrical insulating means (not shown). An electrical current-supplying transformer (not shown) supplies high voltage to the electrostatic field inducers 110. The electrostatic field inducers 110 impart an electrostatic charge to the water component of the emulsion as it passes through the electrostatic field inducers. Such electrostatic charge facilitates the separation of water from oil in the emulsion as the emulsion passes through the grounded louver stack 68.

Proximate to the second end 18 of the tank 12, an angularly disposed baffle 112 extends inwardly into tank 12 and is connected at its inner edge to a vertical transverse baffle 114 having an upper horizontal edge. The upper horizontal edge of the transverse baffle 114 acts as an oil weir 116 and determines the depth of the emulsion throughout the apparatus 10. Baffles 112 and 114, together with the interior surface of tank 12 adjacent the second end 18 of the tank 12, cooperate to define a reservoir 118 into which substantially brine-free oil is discharged.

The transverse baffle 114 serves a three-fold purpose: first, it automatically maintains the liquid level within the sections 22 and 24 at a desired depth; second, it prevents commingling of brine and gas-free oil within the reservoir 118 with the emulsion being treated in the treater section 24; and third, it allows gas and brine-free oil to be withdrawn from the reservoir 118 without affecting the liquid level of emulsion in the heater section 22 and in the treater section 24.

The second end 18 of the tank 12 also has a gas outlet 120, a brine-free oil outlet 122 and a brine outlet pipe 124 positioned therein. The gas outlet 120 extends by its vertical standpipe 126 into a gas zone 128 in the upper portion of the tank 12. The brine outlet pipe 124 extends into the lower interior of the tank 12 and is ported for ingress of the brine for continuous discharge to exterior brine removal facilities (not shown).

A number of inverted, longitudinally-spaced boxes 130 extend longitudinally along the interior bottom portion of tank 12. The boxes 130 have openings 132 in the sides thereof through which sand and silt (not shown) may flow to the interior thereof. The interior of each box 130 is connected to a first slurry conduit 134 that extends outwardly through the tank 12 to a valve 136. Second slurry conduits 138 are connected to each valve 136 and extend to a header 140 adapted to carry settled particulate solids as a slurry when the valves 136 are opened to pressures substantially lower than that within the tank 12. This permits the accumulated sand (with some brine) to be flushed to a disposal site.

In operation, the first and second heaters 34 and 36 supply heat to the heater compartments 32 and 34 at the first end 16 of the tank 12. An oil/water emulsion sequentially flows into the tank 12, via the emulsion inlet port 50, through the two heater compartments 32 and 34 and thence into the treater section 24. The horizontal flow is at a relatively slow flow rate on the order of one-quarter foot to one foot per minute.

The heat supplied by the first heater 34 as the emulsion flows along the upper leg 40 of the first heater 34 is typically only that necessary to lower the viscosity of the emulsion to the extent free gas and free brine separate therefrom. Free gas escapes from the emulsion at this point and the density of the emulsion decreases. The emulsion then flows downwardly and then longitudinally within the first heater 34 towards the second end 18 of the tank 12. The temperature of the emulsion is further increased due to the heating effect of the lower leg 38 of the first heater 34, thereby freeing additional gas and brine from the emulsion.

The gas released in the first heater compartment 30 flows through the upper opening 54 in the longitudinal bulkhead 28 into the upper portion of the second heater compartment 32. Water that separates from the emulsion in the first heater compartment 30 flows transversely through the lower opening 56 in the longitudinal bulkhead 28 into the second heater compartment 32, together with the partially heated emulsion.

As emulsion flows through the second heater compartment 32, it is further heated by the second heater 36. Such further heating is typically only sufficient to lower the viscosity of the emulsion to the point where the remaining dissolved gas is separated from the emulsion. The temperature in the second heater compartment 32 also lowers the viscosity of the emulsion to the extent that a portion of the emulsified brine separates from the emulsion. The separated emulsified brine coalesces into droplets that flow by gravity downwardly to the bottom portion of the second heater compartment 32 and merge with the brine that has flowed to the lower portion of the second heater compartment 32 from the first heater compartment 30.

Emulsion that is substantially free of gas but still contains a substantial quantity of emulsified brine next flows through the intermediate opening 66 in the transverse bulkhead 26 into the treater section 24. Gas flows from the second heater compartment 32 into the upper portion of the treater section 24 through the upper opening 64 in the transverse bulkhead 26. Brine that is collected in the lower portion of the heater section 22 flows through the lower opening 62 in the transverse bulkhead 26 into the lower portion of the treater section 24. It will be appreciated that the flow of gas, brine and emulsion is substantially horizontal, thereby offering low resistance to the rise of gas bubbles and the falling of brine droplets.

In the treater section 24, the emulsion flows to the region of the first demulsifying unit 108. Here, the emulsion passes through the first electrostatic grid 110, where the brine droplets are subject to high potential electrostatic fields surrounding the electrodes, and take on an electrostatic charge therefrom. When so charged, these droplets rapidly move about repelling, attracting and colliding with one another, in energetic action since all droplets receive a charge, regardless of size. Droplets collide with sufficient energy to overcome the emulsifying forces, and combine into larger drops.

Immediately downstream of the first electrostatic grid 110, movement of the emulsion progresses to the first louver stack 68. The emulsion enters the first louver stack 68 through the inlet louver opening 76. Within the first louver stack 68, the electrified emulsion contacts the grounded metal plates 70 and adhesion of the electrified brine droplets occurs. At the metal plates 70, the brine droplets lose their charge and trickle downwardly towards the outlet louver openings 78 and then fall by gravity to the bottom of the tank 12. Also, the deposition of minute brine particles upon the plate 70 causes other droplets to coalesce therewith, thus producing minor streams which trickle downwardly by gravity to the bottom of the tank 12.

The emulsion then continues downstream through successive demulsifying units 108. In each successive demulsifying unit 108, more and more of the brine within the emulsion is removed.

As brine is removed from the emulsion, the resulting demulsified oil is of lesser density than the emulsion and rises to the top of the emulsion for accumulation as an upper strata of oil. The upper strata of oil is free of gas and brine. As the emulsion continues to be supplied to the heater section 22, the liquid level rises in the treater section 24, causing the oil, free of gas and brine, to flow over the weir 116 into the reservoir 118 from which it may be either intermittently or continuously withdrawn without disturbing the liquid level of the emulsion being treated in the treater section 24.

The apparatus 10 maintains a gas-emulsion interface in the treater section 24 and a water-emulsion interface at a predetermined level in the lower portion of the treater section 24, thereby facilitating uniform operation of the treater 10 for continuous feed conditions.

The invention provides the operator with the ability to slow down the flow rate (or, conversely, speed up the flow rate) to maximize the efficiency of the apparatus 10 depending upon changes in the characteristics of the emulsion feed stream. The operator can easily manipulate the flow rate through the apparatus 10 from outside the tank 12 by reducing or expanding the width of the louver openings 76 and 78 within the louver stacks 68.

It will be understood by those familiar with the art that under certain conditions, it may be unnecessary to employ electrostatic charging of the emulsion. Moreover, it will be understood by those familiar with the art that under other certain conditions, it may be unnecessary to employ heating at the upstream end of the apparatus 10.

The invention provides the operator with the ability to accommodate a wide range of A.P.I. gravities of crude oil emulsion, and provides the operator with the ability to deal with emulsions of other differing characteristics, such as differing viscosity characteristics. The invention further provides the operator with the ability to accommodate differing input rates to the apparatus, and gives the operator the ability to accommodate surging emulsion input flow rates. The invention still further gives the operator an opportunity to dislodge occasional plugging problems within the demulsifying units. The invention also provides the operator with the ability to correct miscalculations and misassumptions in the initial design of the apparatus components.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. An emulsion separating treater useful for separating water droplets from an oil/water emulsion, the treater comprising:

(a) a generally horizontal elongate enclosed tank having a longitudinal axis, a first end and an opposed second end;

(b) an emulsion inlet port;

(c) an oil outlet port and a brine outlet port;

(d) a louver stack located within the tank between the emulsion inlet port and the oil outlet port, the louver stack being disposed perpendicular to the longitudinal axis of the tank and comprising a plurality of at least four plates each having an upstream edge and a downstream edge, the upstream edge of each individual plate being disposed at a higher elevation than the downstream edge of that plate, the distance between the upstream edge and the downstream edge on each plate being between about 6 inches and about 36 inches, adjoining upstream edges defining a plurality of generally horizontal inlet louver openings and adjoining downstream edges defining a plurality of generally horizontal outlet louver openings, each inlet louver opening and each outlet louver opening having a louver opening width; and (e) an adjustment mechanism for adjusting the outlet louver opening widths from outside of the tank.

2. The emulsion separating treater of claim 1 wherein the adjustment mechanism adjusts the louver opening widths of both the inlet louver openings and the outlet louver openings.

3. The emulsion separating treater of claim 1 further comprising an emulsion heating section disposed between the emulsion inlet port and the louver stack.

4. The emulsion separating treater of claim 1 wherein the outlet opening width of each outlet opening is adjustable by at least about 0.5 inches.

5. The emulsion separating treater of claim 1 wherein an electrostatic field inducer is disposed within the tank perpendicular to the longitudinal axis of the tank, the electrostatic field inducer being located immediately upstream of the louver stack.

6. The emulsion separating treater of claim 5 wherein the electrostatic field inducer comprises an electrofiable grid.

7. The emulsion separating treater of claim 1 wherein the louver stack comprises between about 70 plates and about 150 plates.

8. The emulsion separating treater of claim 1 wherein the plates are movable by pivoting about a pivot axis disposed substantially horizontally.

9. The emulsion separating treater of claim 8 wherein the pivot axis of each plate is located between that plate's upstream edge and that plate's downstream edge.

10. The emulsion separating treater of claim 1 wherein the adjustment mechanism comprises a push/pull rod.

11. The emulsion separating treater of claim 1 further comprising a plurality of louver stacks disposed between the emulsion inlet port and the oil outlet port.

12. An emulsion separating treater useful for separating water droplets from an oil/water emulsion, the treater comprising:
   (a) a generally horizontal elongate enclosed tank having a longitudinal axis, a first end and an opposed second end;
   (b) an emulsion inlet port;
   (c) an oil outlet port and a brine outlet port;
   (d) a heater section located within the tank between the emulsion inlet port and the oil outlet port;
   (e) a plurality of spaced-apart louver stacks located downstream of the heater section, each louver stack being disposed perpendicular to the longitudinal axis of the tank and comprising a plurality of at least four parallel plates each having an upstream edge and a downstream edge, the upstream edge of each individual plate being disposed at a higher elevation than the downstream edge of that plate, the distance between the upstream edge and the downstream edge on each plate being between about 6 inches and about 36 inches, adjoining upstream edges defining a plurality of generally horizontal inlet louver openings and adjoining downstream edges defining a plurality of generally horizontal outlet louver openings, each inlet louver opening and each outlet louver opening having a louver opening width; and
   (f) an adjustment mechanism for adjusting the outlet louver opening widths from outside of the tank.

13. The emulsion separating treater of claim 12 wherein the outlet opening width of each outlet opening is adjustable by at least about 0.5 inches.

14. The emulsion separating treater of claim 12 wherein an electrostatic field inducer is an electrofiable grid disposed within the tank perpendicular to the longitudinal axis of the tank, the electrostatic field inducer being located immediately upstream of the louver stack.

15. The emulsion separating treater of claim 12 wherein the louver stack comprises between about 70 plates and about 150 plates.

16. The emulsion separating treater of claim 12 wherein the plates are movable by pivoting about a pivot axis disposed substantially horizontally.

17. The emulsion separating treater of claim 16 wherein the pivot axis of each plate is located between that plate's upstream edge and that plate's downstream edge.

18. The emulsion separating treater of claim 12 wherein the adjustment mechanism comprises a push/pull rod.

19. An emulsion separating treater useful for separating water droplets from an oil/water emulsion, the treater comprising:
   (a) a generally horizontal elongate enclosed tank having a longitudinal axis, a first end and an opposed second end;
   (b) an emulsion inlet port;
   (c) an oil outlet port and a brine outlet port;
   (d) a heater section located within the tank between the emulsion inlet port and the oil outlet port;
   (e) a plurality of spaced-apart electrofiable grids located downstream of the heater section;
   (f) a louver stack located immediately downstream of each electrofiable grid, each louver stack being disposed perpendicular to the longitudinal axis of the tank and comprising a plurality of at least four parallel plates each having an upstream edge and a downstream edge, the upstream edge of each individual plate being disposed at a higher elevation than the downstream edge of that plate, the distance between the upstream edge and the downstream edge on each plate being between about 6 inches and about 36 inches, adjoining upstream edges defining a plurality of generally horizontal inlet louver openings and adjoining downstream edges defining a plurality of generally horizontal outlet louver openings, each inlet louver opening and each outlet louver opening having a louver opening width; and
   (g) an adjustment mechanism for adjusting the outlet louver opening widths from outside of the tank.

* * * * *